(12) United States Patent
Yin et al.

(10) Patent No.: US 8,748,909 B2
(45) Date of Patent: Jun. 10, 2014

(54) DISPLAY SYSTEM

(75) Inventors: Victor Yin, Cupertino, CA (US); John Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 93 days.

(21) Appl. No.: 11/556,633

(22) Filed: Nov. 3, 2006

(65) Prior Publication Data

US 2008/0121898 A1    May 29, 2008

(51) Int. Cl.
   *H01L 23/04*    (2006.01)
(52) U.S. Cl.
   USPC .................. 257/88; 257/E23.177; 362/249.04
(58) Field of Classification Search
   USPC .................. 257/E33.057, E23.065, E23.177;
                              362/249.02, 249.04, 249.08
   See application file for complete search history.

(56) References Cited

U.S. PATENT DOCUMENTS

| | | | |
|---|---|---|---|
| 5,280,372 A | 1/1994 | Horiuchi | |
| 5,550,715 A | 8/1996 | Hawkins | |
| 5,569,886 A | 10/1996 | Tanabe et al. | |
| 6,249,267 B1 | 6/2001 | Ishihara | |
| 6,871,982 B2 | 3/2005 | Holman et al. | |
| 7,072,096 B2 | 7/2006 | Holman et al. | |
| 7,775,702 B2 * | 8/2010 | Kuroiwa | 362/634 |
| 2004/0037079 A1 | 2/2004 | Luk | |
| 2004/0109095 A1 * | 6/2004 | Chou | 348/790 |
| 2004/0246696 A1 * | 12/2004 | Yoo | 362/27 |
| 2005/0031291 A1 * | 2/2005 | Gao et al. | 385/142 |
| 2005/0128376 A1 * | 6/2005 | Li et al. | 349/61 |
| 2005/0207156 A1 | 9/2005 | Wang et al. | |
| 2005/0224946 A1 | 10/2005 | Dutta | |
| 2005/0243576 A1 | 11/2005 | Park et al. | |
| 2006/0045530 A1 | 3/2006 | Lim et al. | |
| 2006/0057753 A1 | 3/2006 | Schardt et al. | |
| 2006/0221619 A1 | 10/2006 | Nishigaki | |
| 2007/0253218 A1 | 11/2007 | Tanabe | |

FOREIGN PATENT DOCUMENTS

| | | |
|---|---|---|
| EP | 0 781 660 | 7/1997 |
| JP | 2-85421 | 7/1990 |
| JP | 05 021848 | 1/1993 |
| JP | 6-051293 | 2/1994 |
| JP | 06 314071 | 11/1994 |
| JP | 9-174920 | 7/1997 |
| JP | 2004-349143 | 12/2004 |
| JP | 2006-54140 | 2/2006 |
| JP | 2006-80227 | 3/2006 |
| TW | 200426466 | 12/2004 |

(Continued)

OTHER PUBLICATIONS

IBM Technical Disclosure Bulletin, "Flex Interconnect of Multi-Chip Modules" (1993) 36(12):463-464.

(Continued)

*Primary Examiner* — Wensing Kuo
(74) *Attorney, Agent, or Firm* — Fletcher Yoder PC

(57) ABSTRACT

A display system provides a first semiconductor light source that is electrically connected in a first plane. A second semiconductor light source is electrically connected in a second plane separate from the first plane. A third semiconductor light source is electrically connected in the first plane at least a distance away from the first semiconductor light source equal to the width of the second semiconductor light source. The first plane and the second plane are merged into a combined plane by positioning the electrically connected second semiconductor light source between the electrically connected first semiconductor light source and the electrically connected third semiconductor light source.

29 Claims, 6 Drawing Sheets

(56) References Cited

FOREIGN PATENT DOCUMENTS

| WO | WO-2004/076913 | 9/2004 |
| WO | 2006027883 A1 | 3/2006 |
| WO | WO 2006027883 A1 * | 3/2006 |

OTHER PUBLICATIONS

International Search Report and Written Opinion for PCT/US2007/080198, mailed Sep. 9, 2008, 21 pages.
Invitation to Pay Additional Fees for PCT/US2007/080198, mailed Mar. 4, 2008, 5 pages.
Office Action (translation) for KR 10-2009-7009102, mailed Jul. 30, 2010, 5 pages.
Search Report dated Mar. 20, 2012, directed to European Patent Application No. 11184886.7; 7 pages.
Notification of Reason(s) for Rejection mailed dated May 21, 2012, directed to Japanese Patent Application No. 2009-534745; 1 page.
Japanese Office Action for Japanese patent application No. 2009-534745 dated Dec. 10, 2012.
Office Action for Taiwanese Patent Application No. 096138941 issued on Aug. 13, 2013.
Notification of Reasons for Rejection (translation) for JP 2009-534745, mailed Jun. 27, 2011, 3 pages.
European Examination Report for European Application No. 07843687.0 dated Jan. 13, 2014; 5 pgs.

* cited by examiner

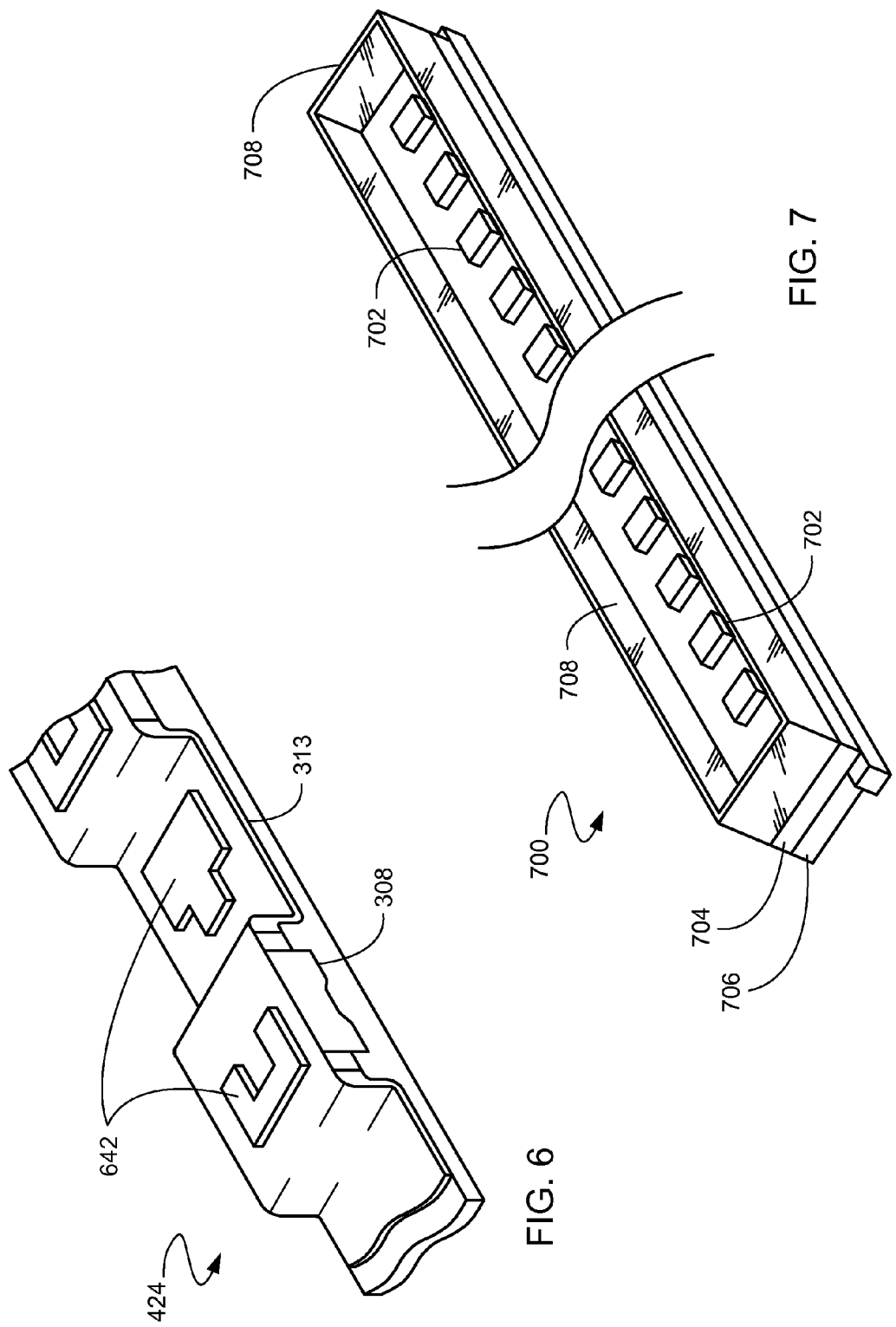

DISPLAY SYSTEM

TECHNICAL FIELD

The present invention relates generally to device display systems, and more particularly to a system for illuminating display systems.

BACKGROUND ART

As computer technology has advanced, the demand for portable computer systems, such as laptops, has increased. Portable computers have dramatically increased the mobility of computing power for the computer user. Since the first portable computer, manufacturers have increased computer mobility by decreasing the size, weight, and power demands of portable computers while increasing the battery life for portable computers.

The monitors presently used contribute greatly to the overall size and weight of the portable computer. The monitor must be of a sufficient size, brightness, and clarity to provide the user with readable images. In order to achieve these requirements, monitors place a great burden on available power resources and are therefore a significant contributor indirectly as well as directly to the weight of the portable computer.

Typically, portable computer monitors utilize a liquid crystal display system. The liquid crystal display systems typically include a top plastic or glass panel and a bottom plastic or glass panel, having a liquid crystal display of thin film transistors and liquid crystal material therebetween. These systems also utilize a backlight system that typically includes a diffuser for passing light evenly to the liquid crystal display, a cold cathode fluorescent lamp ("CCFL") for producing light, a reflector for directing the light toward the diffuser, and a light pipe located between the diffuser and the reflector to spread light to the entire surface of the diffuser.

The use of conventional CCFL liquid crystal display systems in the monitors of portable computers, however, creates a limiting factor in the continuing effort to reduce the size and weight of portable computers. CCFL technology has not kept pace with advances in other technologies that have reduced the size and weight of many of the other display components. Today, one of the major limitations in further reducing the thickness and weight of the display is therefore the CCFL illumination system.

Light-emitting diode ("LED") technology offers attractive alternatives to the CCFL. LEDs are much thinner than the CCFL and do not require many of the weighty power supply systems of the CCFL. However, one LED is not sufficient to light an entire display. Furthermore, some LEDs may have a shorter operating life then a CCFL, and replacing an entire display due to a failed LED can be costly.

Thus, if LEDs are to become a viable alternative to CCFLs, an economical and practical solution must be found for a way to mount a large number of LEDs in a small space and for avoiding the cost of replacing an entire display when there is an LED failure.

In view of ever-increasing commercial competitive pressures, increasing consumer expectations, and diminishing opportunities for meaningful product differentiation in the marketplace, it is increasingly critical that answers be found to these problems. Moreover, the ever-increasing need to save costs, improve efficiencies, improve performance, and meet such competitive pressures adds even greater urgency to the critical necessity that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a display system. A first semiconductor light source is electrically connected in a first plane. A second semiconductor light source is electrically connected in a second plane separate from the first plane. A third semiconductor light source is electrically connected in the first plane at least a distance away from the first semiconductor light source equal to the width of the second semiconductor light source. The first plane and the second plane are merged into a combined plane by positioning the electrically connected second semiconductor light source between the electrically connected first semiconductor light source and the electrically connected third semiconductor light source.

Certain embodiments of the invention have other advantages in addition to or in place of those mentioned above. The advantages will become apparent to those skilled in the art from a reading of the following detailed description when taken with reference to the accompanying drawings.

BRIEF DESCRIPTION OF THE DRAWINGS

FIG. 6 is an enlarged detail from FIG. 5 of the bottom flex;

FIG. 7 is a view of a removable light strip according to an alternate embodiment of the present invention.

BEST MODE FOR CARRYING OUT THE INVENTION

Figure 1:
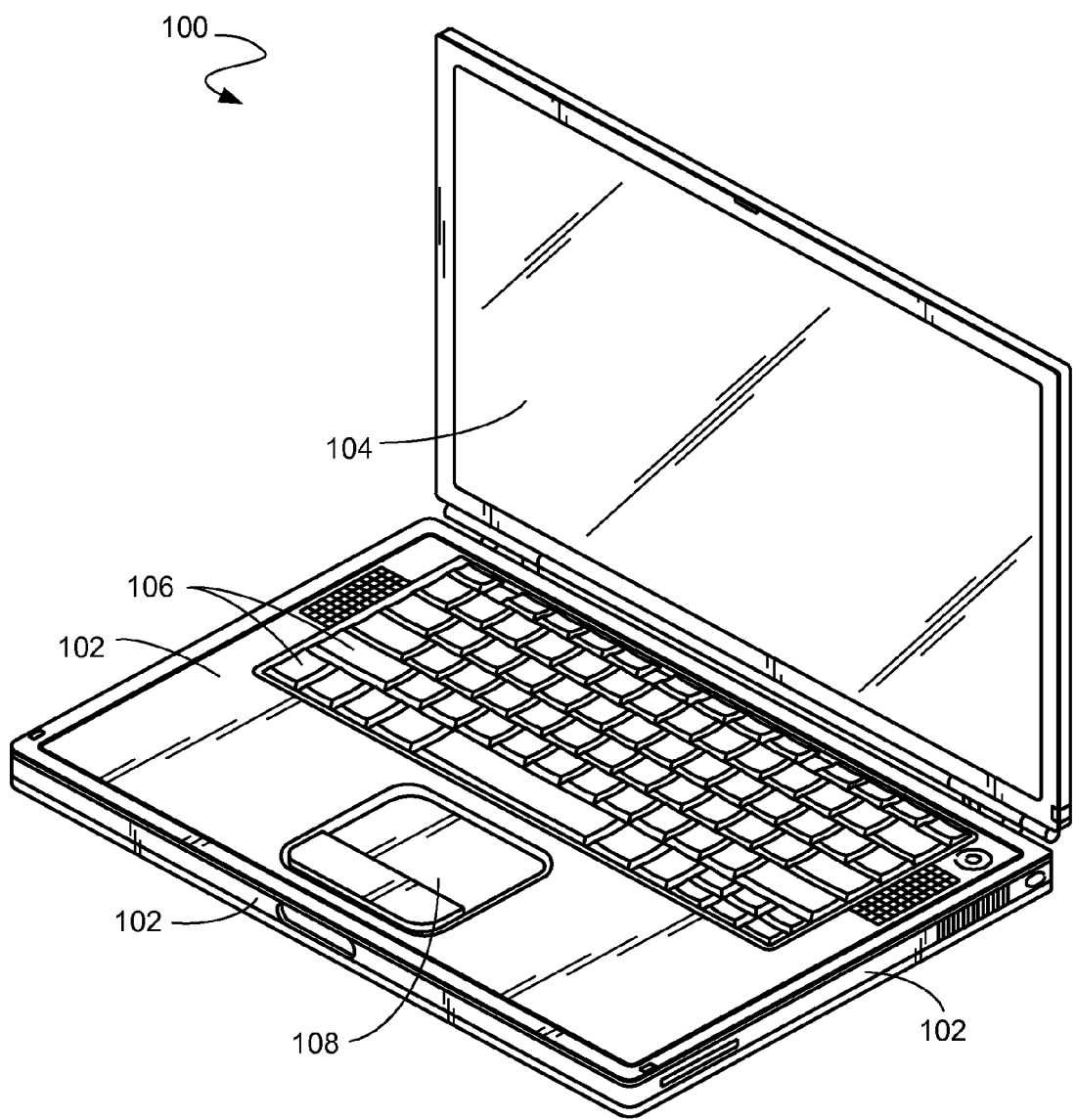
FIG. 1 is a view of a portable computer incorporating a screen with a removable light strip according to the present invention.

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and operational steps are not disclosed in detail.

Likewise, the drawings showing embodiments of the devices are semi-diagrammatic and not to scale and, particularly, some of the dimensions are for the clarity of presentation and are shown exaggerated in the drawing FIGS. Also, where multiple embodiments are disclosed and described having some features in common, for clarity and ease of illustration, description, and comprehension thereof, similar and like features one to another will ordinarily be described with like reference numerals.

The term "horizontal" as used herein is defined as a plane parallel to the bottom plane or surface of the portable computer when it is in its ordinary operating position with the bottom surface lowermost, below the keyboard. The term "vertical" refers to a direction perpendicular to the horizontal as just defined. Terms, such as "on", "above", "below", "bottom", "top", "side" (as in "sidewall"), "higher", "lower", "upper", "over", and "under", are defined with respect to the horizontal plane, unless understood otherwise within and as a result of a particular context.

Referring now to FIG. 1, therein is shown a portable computer 100 having a base 102 attached to a screen 104. In this embodiment, the base 102 contains most of the components of the portable computer 100 such as a keyboard 106, a trackpad 108, a disk drive (not shown), and the motherboard (not shown).

Figure 2:
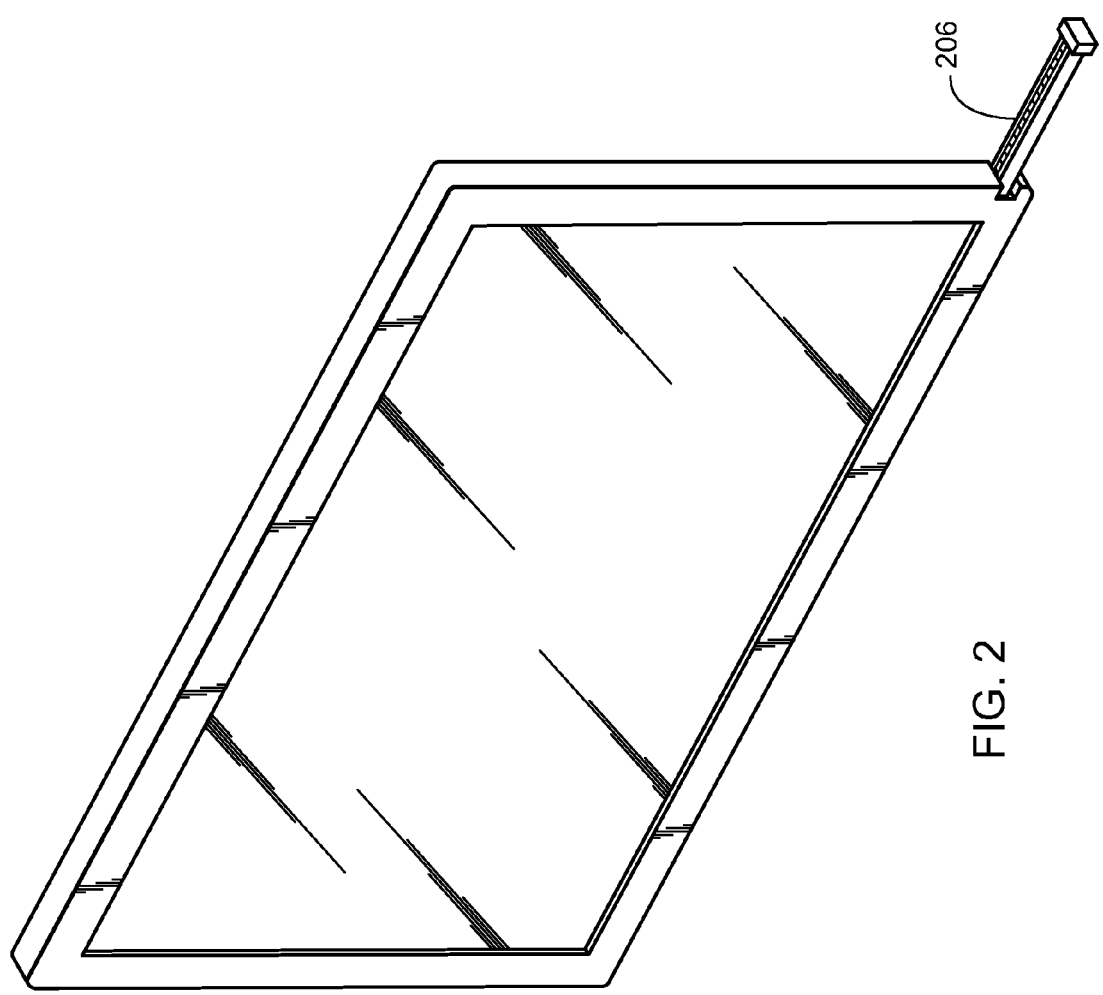
FIG. 2 is an enlarged detail from FIG. 1 of the screen with the removable light strip.

Referring now to FIG. 2, therein is shown a close up of the screen 104. In this embodiment the screen 104 is a liquid crystal display ("LCD"). The screen 104 is electrically connected by suitable connectors (not shown, but see the power feed contact 318, FIG. 3) to a removable light strip 206. The removable light strip 206, which is shown partially inserted into the screen 104, illuminates the screen 104 from the base or bottom thereof. When fully inserted into the screen 104, the removable light strip 206 is retained therein by a suitable retaining means, such as a detent, latch, and so forth.

The removable light strip 206 contains light sources such as semiconductor light sources or organic light sources. As will be explained in greater detail herein, a particular advantage of the removable light strip 206 is that it is readily replaceable, such as for servicing or upgrading. Thus, for example, if the removable light strip 206 or portions thereof fail, the removable light strip 206 may be readily, quickly, and inexpensively removed from the screen 104 for quick replacement. Similarly, as light source technologies continue to improve over time, newer and better performing removable light strips 206 can be easily exchanged for earlier ones, as desired.

With existing, prior art light sources, such as typical cold cathode fluorescent lamp ("CCFL") light sources, when the light source fails, the entire screen must ordinarily be replaced. This is a costly solution, in terms of both labor and materials. In contrast, the removable light strip 206 according to the present invention is a quick and cost effective solution that does not require the replacement of an entire screen. Thus, the removable light strip 206 saves time and money while extending the life of the screen 104 and the portable computer 100 (FIG. 1).

Figure 3:
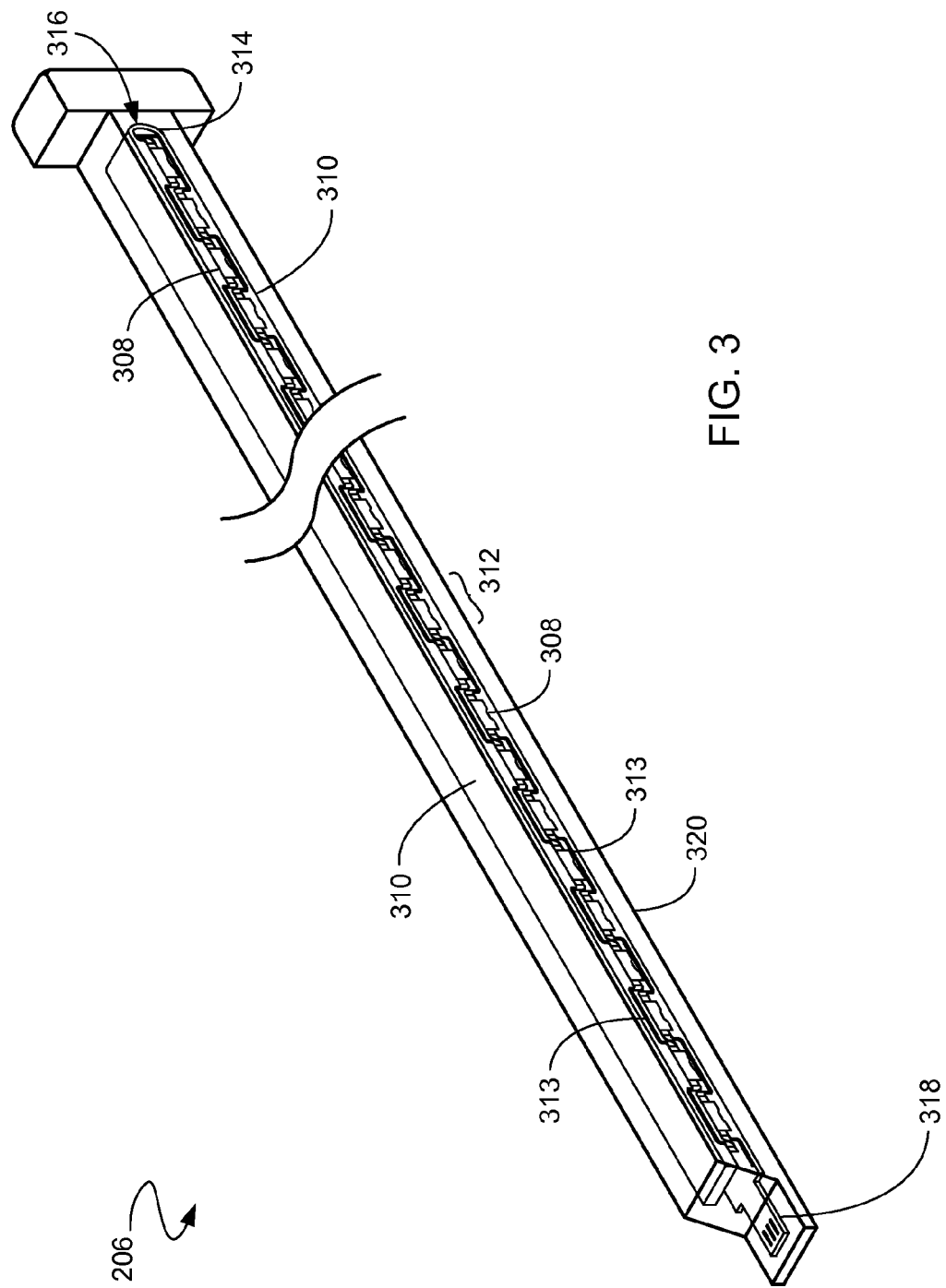
FIG. 3 is an enlarged detail from FIG. 2 of the removable light strip.

Referring now to FIG. 3, therein is shown a close up of the removable light strip 206. In this embodiment, side firing light-emitting diodes ("LEDs") 308 are mounted on and electrically connected to one another on a flex 310. The flex 310 is a conventional flexible medium onto which electrical components and connections are mounted. The LEDs 308 are spaced a distance 312 from each other. The distance 312 is equal to or greater then the length of the LEDs 308 and forms alignment areas 313. In this embodiment, the flex 310 has a fold 314 where the flex 310 is folded back on itself to form a folded flex 316. The folded flex 316 has a power feed contact 318 that connects (not shown) to the screen 104 (FIG. 2) when inserted therein to. The folded flex 316 is encased in an assembly housing 320. The assembly housing 320 provides support for the folded flex 316, the LEDs 308, and the power feed contact 318.

LEDs, such as the LEDs 308, are point light sources. Therefore when illuminating a screen with LEDs, many LEDs must be used to efficiently and economically obtain uniform illumination of the screen. Desired brightness levels are much more readily and economically obtained as well through the use of multiple LEDs, since LED costs increase dramatically with higher output light levels.

In order to achieve uniform and economical lighting across the screen with the brightest light levels, the LEDs must preferably be spaced as closely together as possible. However, when mounting LEDs on a flex, design rules for electrical connections limit how closely the LEDs may be mounted to each other. Therefore, although there has been a prior focus on technology that reduces the spacing between LEDs, spaces and gaps still remain, thus limiting the possible LED densities that can be achieved.

In the present invention it has been unexpectedly discovered that increased LED density can be achieved, not by decreasing, but rather by increasing the spacing between the LEDs. Thus, as unexpectedly discovered and as taught herein, increasing the spacing between the LEDs 308 on the flex 310 according to the present invention actually results in a decrease in spacing between the LEDs 308 in the folded flex 316. Thus, the LEDs 308 can be mounted on the folded flex 316 with maximum density and little or no space at all between the LEDs 308.

Figure 4:
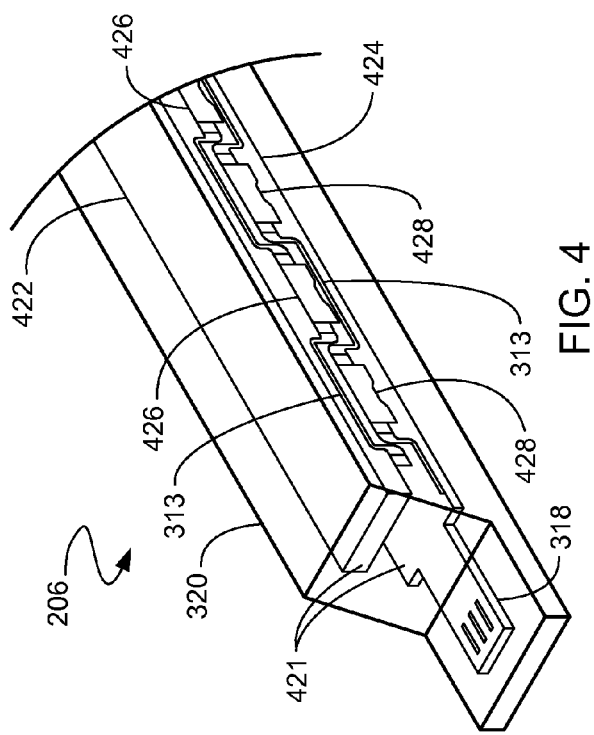
FIG. 4 is an enlarged detail from FIG. 3 of a portion of the removable light strip.

Referring now to FIG. 4, therein is shown a close up of a portion of the removable light strip 206. A combined flex 421 is formed when a top flex 422 and a bottom flex 424 are merged. In this embodiment, the top flex 422 and the bottom flex 424 are of the same basic construction, are about the same length, and are part of the same flex 310 (FIG. 3), connected together by the fold 314 (FIG. 3). However in alternate embodiments (not shown), the top flex 422 and the bottom flex 424 may be separate and not connected by the fold 314 (FIG. 3). In those alternate embodiments, the top flex 422 and the bottom flex 424 would ordinarily utilize separate power feed contacts such as the power feed contact 318.

The top flex 422 has top LEDs 426 and the bottom flex 424 has bottom LEDs 428. The top LEDs 426 and the bottom LEDs 428 are positioned to fit into the alignment areas 313. Thus, the top LEDs 426 and the bottom LEDs 428 alternate between each other, forming a line in the combined flex 421 where the linear density of LEDs has been maximized. The combined flex 421 is electrically connected to the power feed contact 318. The assembly housing 320 encloses the combined flex 421 and the power feed contact 318.

Figure 5:
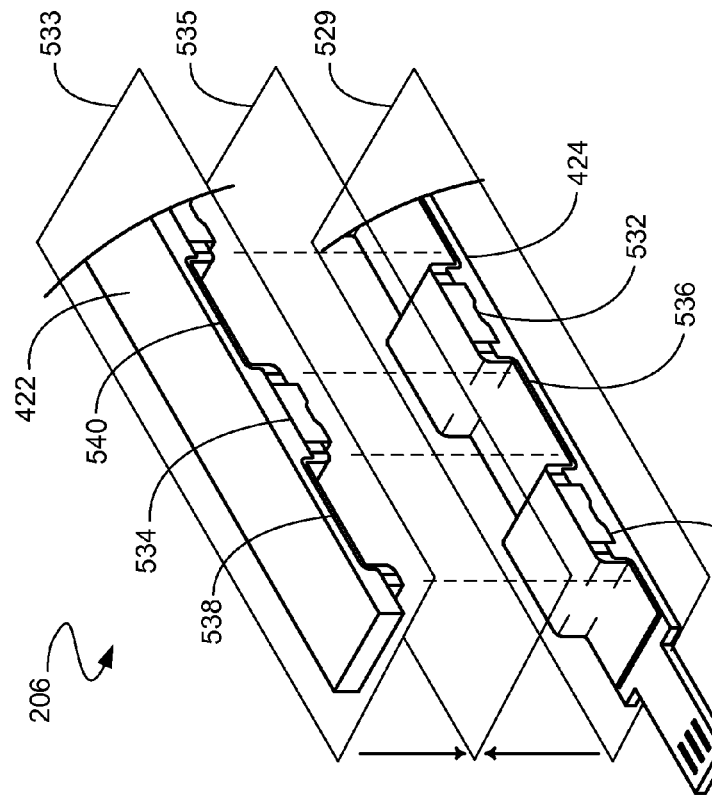
FIG. 5 is the removable light strip of FIG. 4 without the assembly housing and with the top flex separated from the bottom flex.

Referring now to FIG. 5, therein is shown the removable light strip 206 of FIG. 4 without the assembly housing 320 (FIG. 4) and with the top flex 422 separated from the bottom flex 424. The bottom flex 424 has a first LED 530 electrically connected (by conductors, not shown, on the top surface of the bottom flex 424) to a third LED 532, thus forming a first plane 529. The top flex 422 has a second LED 534 electrically connected thereon in similar fashion, and connected as well to at least another LED, thus forming a second plane 533 separate from the first plane 529. Due to the conventional configuration of flex structures, such as the bottom flex 424 and the top flex 422, the electrical connections of the LEDs 530, 532, 534 ordinarily need to be made before the first plane 529 and the second plane 533 are combined (as described further hereinbelow). The second LED 534 thus has the characteristics of having been electrically connected in the second plane 533 separate from the first plane 529.

The second LED 534 then fits into a bottom alignment area 536 that is equal to or slightly larger then the width of the second LED 534. Likewise, the first LED 530 fits into a first top alignment area 538 that is equal to or slightly larger then the width of the first LED 530, and the third LED 532 fits into a second top alignment area 540 that is equal to or slightly larger then the width of the third LED 532. This configuration is repeated for the lengths of the top and bottom flexes 422 and 424. When the top flex 422 and the bottom flex 424 are thus positioned and combined, the first LED 530, the second LED 534, and the third LED 532 merge into a combined plane 535.

Referring now to FIG. 6, therein is shown a close up of a portion of the bottom flex 424. In this embodiment, alignment features 642 are formed on the LEDs 308 and the alignment areas 313. Similar (complementary and matching) alignment features are likewise formed on the top flex 422. The alignment features 642 are used to aid the alignment of the top flex 422 (FIG. 5) and the bottom flex 424 during formation of the folded flex 316 (FIG. 3).

Referring now to FIG. 7, therein is shown a removable light strip 700, according to an alternate embodiment of the present invention. LED dies 702 are mounted on a top layer printed circuit board ("PCB") 704 and electrically connected to one another on a bottom layer PCB 706. In this embodiment, the LED dies 702 are top firing, however in alternate embodiments (not shown) the LED dies 702 may be side firing. Reflector walls 708 are attached to the top layer PCB 704 and surround the LED dies 702.

In prior configurations, the LED dies 702 have been electrically connected to one another in the top layer PCB 704. Thus, the spacing between the LED dies 702 is restricted by the space needed for the electrical connections. However, in the removable light strip 700, according to the present invention, by electrically connecting the LED dies 702 to one another in the bottom layer PCB 706, the spacing between the LED dies 702 is no longer restricted by electrical connections. Thus, the LED dies 702 are mounted at a distance less then needed in the top layer PCB 704 to electrically connect the LED dies 702 to each other. It therefore becomes possible to achieve maximum density of the LED dies 702, with the very minimum spacing therebetween, by separating the PCB mounting function from the PCB electrical connection function. The mounting function is efficiently accomplished by the top layer PCB 704, and the electrical connection function is accomplished by the bottom layer PCB 706. By thus separating the mounting function and the electrical connection function into separate physical planes, a maximum LED density is enabled and achieved.

Figure 8:
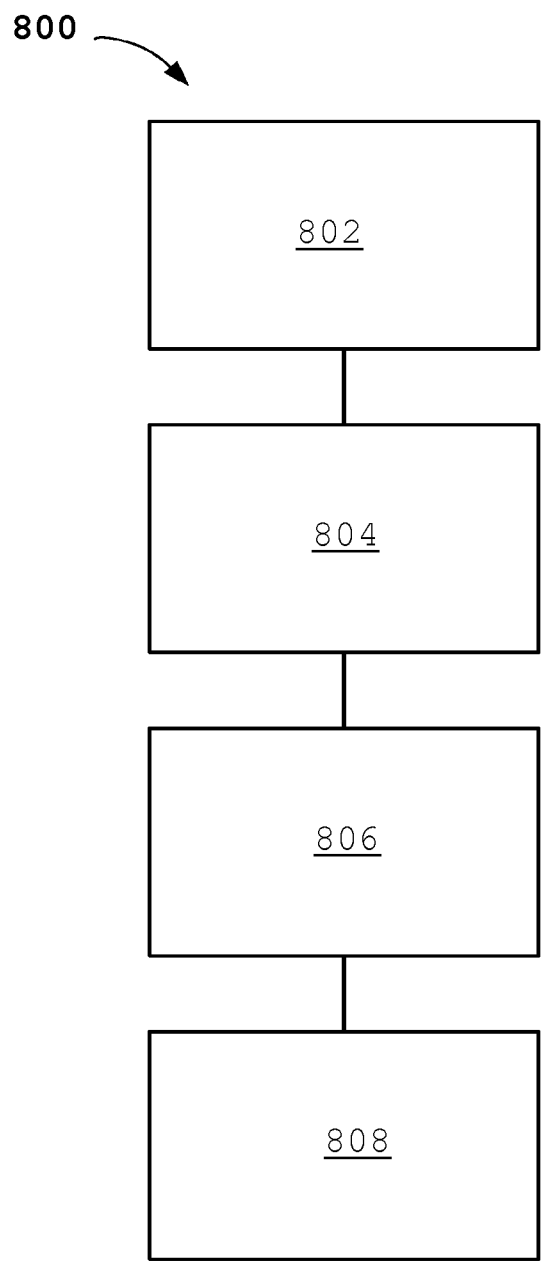
FIG. 8 is a flow chart of a system for a display system in accordance with an embodiment of the present invention.

Referring now to FIG. 8, therein is shown a flow chart of a system 800 for a display system in accordance with an embodiment of the present invention. The system 800 includes electrically connecting a first semiconductor light source in a first plane in a block 802; electrically connecting a second semiconductor light source in a second plane separate from the first plane in a block 804; electrically connecting a third semiconductor light source in the first plane at least a distance away from the first semiconductor light source equal to the width of the second semiconductor light source in a block 806; and merging the first plane and the second plane into a combined plane by positioning the electrically connected second semiconductor light source between the electrically connected first semiconductor light source and the electrically connected third semiconductor light source in a block 808.

In greater detail, a system to decrease the spacing between light sources and increase illumination of a screen, according to an embodiment of the present invention, is performed as follows:
1. The alignment features 642 are formed on the LEDs 308 and the alignment areas 313. (FIG. 6)
2. The second LED 534 on the top flex 422 is positioned to fit into the bottom alignment area 536, and the first LED 530 and the third LED 532 are positioned to fit into the first top alignment area 538 and the second top alignment area 540 respectively. (FIG. 5)
3. The assembly housing 320 encloses the top flex 422 and the bottom flex 424. (FIG. 4)
4. The top flex 422 and the bottom flex 424 are connected by the fold 314 and form the folded flex 316. The folded flex 316 together with the power feed contact 318 are both enclosed in the assembly housing 320 and form the removable light strip 206. (FIG. 3)
5. The removable light strip 206 fits into and illuminates the screen 104. (FIG. 2)

It has been discovered that the present invention thus has numerous advantages.

A principle advantage that has been unexpectedly discovered is that the present invention can increase the illumination of a screen by increasing the substrate spacing between light sources.

Another advantage of the present invention is that it increases the life of a screen and reduces the cost of repairing screens when light sources fail.

Yet another important advantage of the present invention is that it valuably supports and services the historical trend of reducing costs, simplifying systems, and increasing performance.

These and other valuable aspects of the present invention consequently further the state of the technology to at least the next level.

Thus, it has been discovered that the removable light strip of the present invention furnishes important and heretofore unknown and unavailable solutions, capabilities, and functional advantages for display systems. The resulting processes and configurations are straightforward, cost-effective, uncomplicated, highly versatile and effective, can be implemented by adapting known technologies, and are thus readily suited for efficiently and economically manufacturing display systems.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A display system, comprising:
   a first semiconductor light source electrically connected in a first plane;
   a second semiconductor light source having the characteristics of having been electrically connected in a second plane separate from the first plane;
   a third semiconductor light source electrically connected in the first plane at least a distance away from the first semiconductor light source equal to the width of the second semiconductor light source; and
   the second semiconductor light source being positioned between the first semiconductor light source and the third semiconductor light source to merge the first plane and the second plane into a combined plane, wherein the combined plane is configured to be removably inserted into and positioned in an edge portion of a fully assembled housing of a fully assembled display screen, wherein the fully assembled housing includes an aperture for allowing insertion and removal of the combined plane into the edge portion of the fully assembled display screen, without disassembling the display screen and without inserting or removing other components of the display screen, wherein the aperture is located at a corner portion of the fully assembled display screen and allows for insertion and removal of the combined plane in a direction parallel to a longitudinal axis of the edge portion and a longitudinal axis of the combined plane, wherein the combined plane is fully contained within the edge portion of the fully assembled display housing and does not encroach into any portion behind a display area of the fully assembled display screen, and wherein the display screen comprises circuitry for driving the first, second, and third light sources, and the circuitry for driving is separate from the combined plane.

2. The system of claim 1 further comprising:
a flex; and
wherein the first semiconductor light source, the second semiconductor light source, and the third semiconductor light source are mounted on the flex.

3. The system of claim 2 further comprising a fold in the flex.

4. The system of claim 1 further comprising:
a bottom flex; and
a top flex; and
wherein:
the first semiconductor light source and the third semiconductor light source are mounted on the bottom flex; and
the second semiconductor light source is mounted on the top flex.

5. The system of claim 4 further comprising a combined flex formed by merging the top flex and the bottom flex.

6. The system of claim 1 further comprising an alignment area, equal to the width of the second semiconductor light source, in the first plane between the first semiconductor light source and the third semiconductor light source.

7. The system of claim 6 wherein the second semiconductor light source is positioned in the alignment area.

8. The system of claim 1 further comprising a power feed contact electrically connected to the first semiconductor light source, the second semiconductor light source, and the third semiconductor light source.

9. The system of claim 1 further comprising an assembly housing enclosing the first semiconductor light source, the second semiconductor light source, and the third semiconductor light source, wherein the assembly housing is configured to be inserted into the aperture of the fully assembled housing.

10. The system of claim 1 wherein the first, second, and third semiconductor light sources are respective first, second, and third LEDs.

11. The system of claim 1 wherein the combined plane is a removable light strip.

12. The system of claim 11 further comprising a screen electrically connected to the removable light strip.

13. The system of claim 1 further comprising:
first alignment features formed on the first, second, and third semiconductor light sources;
complementary and matching second alignment features formed in the first plane and the second plane; and
the first alignment features and second alignment features aligning the first plane and the second plane.

14. A display system, comprising:
a first point light source electrically connected in a first plane;
a second point light source having the characteristics of having been electrically connected in a second plane separate from the first plane;
a third point light source electrically connected in the first plane a distance away from the first point light source equal to the width of the second point light source; and
the second point light source being positioned between the first point light source and the third point light source to merge the first plane and the second plane into a combined plane, wherein the combined plane is configured to be removably inserted into and positioned in an edge portion of a fully assembled housing of an assembled display device, wherein the fully assembled housing includes an aperture for allowing insertion and removal of the combined plane into the edge portion of the assembled display screen, without disassembling the display screen and without inserting or removing other components of the display, wherein the aperture is located at a corner portion of the fully assembled display screen and allows for insertion and removal of the combined plane in a direction parallel to a longitudinal axis of the edge portion and a longitudinal axis of the combined plane, wherein the combined plane is fully contained within the edge portion of the fully assembled display housing and does not encroach into any portion behind a display area of the assembled display device, and wherein the display screen comprises circuitry for driving the first, second, and third light sources, and the circuitry for driving is separate from the combined plane.

15. The system of claim 14 wherein the first, second, and third point light sources are respective first, second, and third organic light sources.

16. The system of claim 14 further comprising:
a flex; and
wherein the first point light source, the second point light source, and the third point light source are mounted on the flex.

17. The system of claim 16 further comprising a fold in the flex.

18. The system of claim 14 further comprising:
a bottom flex; and
a top flex; and
wherein:
the first point light source and the third point light source are mounted on the bottom flex; and
the second point light source is mounted on the top flex.

19. The system of claim 18 further comprising a combined flex formed by merging the top flex and the bottom flex.

20. The system of claim 14 further comprising an alignment area, equal to the width of the second point light source, in the first plane between the first point light source and the third point light source.

21. The system of claim 20 wherein the second point light source is positioned in the alignment area.

22. The system of claim 14 further comprising a power feed contact electrically connected to the first point light source, the second point light source, and the third point light source.

23. The system of claim 14 further comprising an assembly housing enclosing the first point light source, the second point light source, and the third point light source, wherein the assembly housing is configured to be inserted into the aperture of the fully assembled housing.

24. The system of claim 14 wherein the first, second, and third point light sources are respective first, second, and third LEDs.

25. The system of claim 14 wherein the combined plane is a removable light strip.

26. The system of claim 25 further comprising a screen electrically connected to the removable light strip.

27. The system of claim 14 further comprising:
  first alignment features formed on the first, second, and third point light sources;
  complementary and matching second alignment features formed in the first plane and the second plane; and
  the first alignment features and second alignment features aligning the first plane and the second plane.

28. A display system, comprising:
  a light strip having a plurality of lightsources contained within a light strip housing, wherein the lightstrip is configured to be removably inserted into and positioned in an edge portion of a fully assembled housing of a fully assembled display screen, wherein the fully assembled housing includes an aperture for allowing insertion and removal of the lightstrip into the edge portion of the fully assembled display screen, without disassembling the display screen and without inserting or removing other components of the display screen, wherein the aperture is located at a corner portion of the fully assembled display screen and allows for insertion and removal of the lightstrip in a direction parallel to a longitudinal axis of the edge portion and a longitudinal axis of the lightstrip, and wherein the lightstrip is fully contained within the edge portion of the fully assembled display housing and does not encroach into any portion behind a display area of the fully assembled display screen.

29. The system of claim 28, wherein the light strip further comprises:
  a first semiconductor light source electrically connected in a first plane;
  a second semiconductor light source having the characteristics of having been electrically connected in a second plane separate from the first plane;
  a third semiconductor light source electrically connected in the first plane at least a distance away from the first semiconductor light source equal to the width of the second semiconductor light source; and
  the second semiconductor light source being positioned between the first semiconductor light source and the third semiconductor light source to merge the first plane and the second plane into a combined plane.

* * * * *